July 3, 1962 W. D. GOSSLAU 3,042,869
ULTRA-HIGH FREQUENCY HETERODYNE RECEIVER CONTAINING TANK CIRCUIT ARRANGEMENT
Filed June 28, 1960
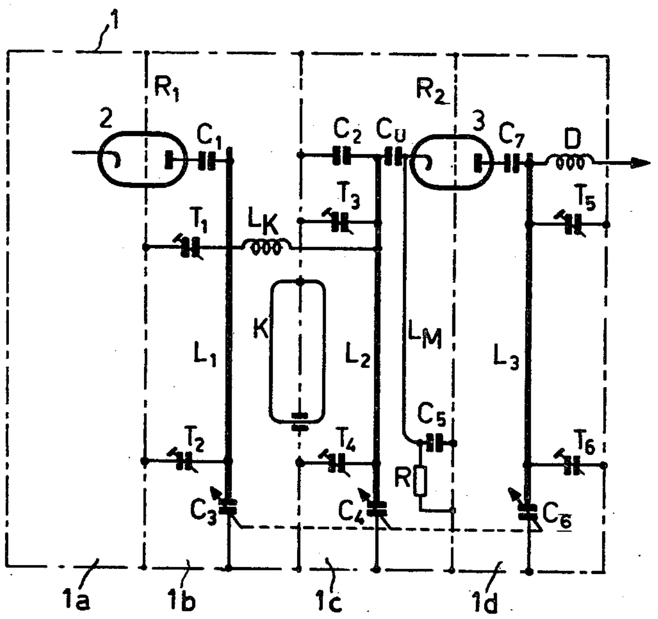
INVENTOR
WOLF D. GOSSLAU
BY
Frank R. Trifari
AGENT

United States Patent Office 3,042,869

Patented July 3, 1962

3,042,869

ULTRA-HIGH FREQUENCY HETERODYNE RECEIVER CONTAINING TANK CIRCUIT ARRANGEMENT

Wolf Dietrich Gosslau, Dusseldorf, Germany, assignor to North American Philips Company, Inc., New York, N.Y., a corporation of Delaware Filed June 28, 1960, Ser. No. 39,383
Claims priority, application Germany Aug. 8, 1959
5 Claims. (Cl. 325—436)

The invention relates to an ultra-high frequency heterodyne receiver including a tank circuit arrangement comprising two inductively and/or capacitively coupled band-pass filter resonant circuits to which a preferably self-oscillating mixer stage is inductively coupled, for example through a conductor loop connected in parallel with the inner conductor of the second band-pass filter circuit.

Such receivers have a limitation in that the maximum value of the oscillator oscillations appearing in the mixer stage, which have a comparatively large amplitude and are closely adjacent the input oscillations in frequency, must be limited at the input of the band-pass filter and of the antenna in order to prevent them from interfering with receivers in the vicinity. In spite of careful design of the arrangement and even when several known steps are taken with respect to screening and neutralisation, it has been found that oscillator voltages always reach the antenna input and partly also the outer surface of the housing of the heterodyne portion so that there is considerable radiation.

In an ultra-high frequency heterodyne receiver of the kind described, these limitations can be eliminated if, in accordance with the invention, between the part of the coupling loop connected to the mixer stage and an adjacent part of the said inner conductor at which the potential of the input oscillations is a maximum, a small capacitor is connected of a value such that at the input of the band-pass filter the oscillations at oscillator frequency are at least substantially compensated.

The invention will now be described more fully, by way of example, with reference to the drawing which shows the heterodyne portion.

The heterodyne portion 1 comprises four chambers 1*a*, 1*b*, 1*c* and 1*d* designed as resonant circuits which may be tunable. The input oscillations are supplied by an antenna to an input circuit (not shown) which is arranged in the first chamber 1*a* and controls an electron tube 2 in known manner through the cathode of this tube. The grid of this triode 2 is connected to the wall between the chambers 1*a* and 1*b*. The direct-current supply conductors for this valve and for a mixer tube 3 connected between the chambers 1*c* and 1*d* are conventional and not shown for the sake of clarity.

The anode of the tube 2 is connected through a capacitor $C_1$ to an inner conductor $L_1$ of the second chamber 1*b* to couple the input oscillations to the chamber 1*b*. The conductor $L_1$ is connected near its ends through trimmer capacitors $T_1$ and $T_2$ to the wall between the chambers 1*a* and 1*b*. The other end of the conductor $L_1$ is connected through a variable capacitor $C_3$, for example a rotary capacitor, to the outer wall at the end face of the chamber 1*b* so that the resulting resonant circuit can be tuned by variation of the capacitor $C_3$.

The next chamber 1*c* contains an inner conductor $L_2$ which is connected through trimmer capacitors $T_3$ and $T_4$ to the wall between the chambers 1*b* and 1*c*. The lower end of this conductor is connected through a variable tuning capacitor $C_4$ to the end face of the chamber wall 1*c*. A coupling loop K is provided on either side of the wall between the chambers 1*b* and 1*c* to couple the input oscillations from chamber 1*b* to chamber 1*c*. The upper part of loop K is conductively connected to the wall while its lower part is passed through an aperture in the wall in an insulating manner. The upper end of the conductor $L_2$ is connected through a capacitor $C_2$ to the wall between the chambers 1*b* and 1*c* also.

In the wall between the chambers 1*c* and 1*d* provision is made of a self-oscillating mixer tube 3 the grid of which is conductively connected to this wall. Its cathode is connected to a conductor loop $L_M$ to couple the input oscillations to the tube 3. The larger part of loop $L_M$ extends parallel to the inner conductor $L_2$ of this tank circuit while the other end of the loop $L_M$ is connected through a capacitor $C_5$ and a resistor R to the wall between the chambers 1*c* and 1*d*.

The anode of the valve 3 is connected through a capacitor $C_7$ to an inner conductor $L_3$ in the chamber 1*d* to effect the generation of local oscillations of a frequency determined by the chamber 1*d*. This inner conductor is connected through trimmer capacitors $T_5$ and $T_6$ to the outer wall and through a variable tuning capacitor $C_6$ to one end face. One of the intermediate frequencies produced can be taken through a high-frequency choke coil D from the capacitor $C_7$.

By means of the circuit components shown, particularly the trimmer capacitors and an auxiliary coupling coil $L_K$ connected between the conductors $L_1$ and $L_2$ and, if required, by apertures in at least one of the walls, the known circuit arrangement described so far can be designed so as they have a certain band-pass characteristic. Particularly, the input circuit in the chamber 1*a* and the band-pass filter in the chambers 1*b* and 1*c* may be designed to have desired band-pass characteristics so that tuning of the oscillator circuit in the chamber 1*d* enables the reception of signals in the desired range of, say, from 470 to 800 mc./s., as may be required for television reception in the ultra-high frequency range. By adjustment of the separate coupling members, it can further be ensured that the oscillator amplitude at the self-oscillating mixer stage including the valve 3 is substantially constant and that a satisfactory conversion gain is obtained throughout the entire range.

In known circuit arrangements of this kind, however, the oscillator oscillations were transmitted in a considerable degree by the chamber 1*d* to the circuits in the chambers 1*b* and 1*a* and thus to the antenna. According to the invention, this is avoided by the provision of a small compensating capacitor $C_u$ of, for example, 2 pf. between the cathode of the valve 3 and the end of the inner conductor $L_2$ of the secondary circuit of the band-pass filter in the chamber 1*c* not connected to the tuning capacitor $C_4$. Surprisingly, this proved to produce a material reduction of the oscillator oscillations transmitted to the antenna.

Preferably capacitor $C_u$ should be connected to the inner conductor $L_2$ at a point nearer to an oscillator frequency antinode in the high-frequency part of the tuning range of the oscillator than to an oscillator frequency antinode in the low-frequency part of the tuning range of the oscillator. This ensures that compensation is produced at high frequencies, that is to say in the range in which reactive superposition of the oscillator oscillations is a maximum; thus a more even compensation is obtained. The described shifting of the antinodes is produced in known manner by variation of the tuning capacitor $C_4$ which is mechanically coupled with the tuning capacitors $C_3$ and $C_6$.

What is claimed is:

1. An ultra-high frequency heterodyne receiver comprising first and second tank circuit chambers having centrally disposed inner conductors, a source of signal oscillations, means applying said signal oscillations to said first chamber, means for coupling said signal from said first chamber to said second chamber, a mixing device having a control electrode, means providing local oscillations connected to said mixing device, means inductively coupling the signal oscillations in said second chamber to said control electrode, and means for substantially reducing oscillations of the frequency of said local oscillations at the input of said receiver comprising a capacitor connected between said control electrode and a potential antinode point on the inner conductor of said second chamber.

2. An ultra-high frequency heterodyne receiver comprising first and second tank circuit chambers having centrally disposed inner conductors, a source of signal oscillations, means applying said signal oscillations to the central conductor of said first chamber, means for coupling said signal from said first chamber to said second chamber, an electron discharge device having a cathode and a grid, means connecting said grid to the wall of said second chamber, means inductively coupling the signal oscillations in said second chamber to said cathode, means providing local oscillations connected to said discharge device, and means for substantially reducing oscillations of the frequency of said local oscillations at the input of said receiver comprising a capacitor connected between said cathode and a potential antinode point on the inner conductor of said second chamber.

3. An ultra-high frequency heterodyne receiver comprising first, second and third tunable tank circuit chambers having centrally disposed inner conductors, a source of signal oscillations, means applying said signal oscillations to the inner conductor of said first chamber, means coupling said signal oscillations from said first chamber to said second chamber, an electron discharge device having cathode, grid, and anode electrodes, means connecting said grid electrode to the wall of said second chamber, means inductively coupling the signal oscillations in said second chamber to said cathode electrode, means connecting the inner conductor of said third chamber to said anode electrode whereby local oscillations are generated at a frequency determined by said third chamber, and means substantially compensating for oscillations of the frequency of said local oscillations at the input of said receiver comprising a capacitor connected between said cathode electrode and a potential antinode point on the inner conductor of said second chamber.

4. The receiver of claim 3 in which said means coupling said signal oscillations to said cathode electrode comprises a conductor loop extending parallel to the inner conductor of said second chamber.

5. The receiver of claim 3 comprising first, second and third ganged variable capacitors disposed in said first, second and third chambers respectively and connected between a wall and one end of the inner conductor of the respective chamber.

References Cited in the file of this patent

UNITED STATES PATENTS

| | | |
|---|---|---|
| 2,147,556 | Schlesinger | Feb. 14, 1939 |
| 2,314,309 | Hobbs | Mar. 16, 1943 |
| 2,819,391 | Reiches | Jan. 7, 1958 |